US010050501B2

(12) United States Patent
Nakano et al.

(10) Patent No.: US 10,050,501 B2
(45) Date of Patent: Aug. 14, 2018

(54) BRUSHLESS MOTOR

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Takumi Nakano, Kariya (JP); Takeru Matsumoto, Aichi-ken (JP); Daisuke Miyata, Obu (JP); Makoto Morita, Mishima (JP); Akihiro Yanaka, Nagoya (JP)

(73) Assignees: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 364 days.

(21) Appl. No.: 14/874,661

(22) Filed: Oct. 5, 2015

(65) Prior Publication Data
US 2016/0099634 A1 Apr. 7, 2016

(30) Foreign Application Priority Data
Oct. 6, 2014 (JP) ................................ 2014-205432

(51) Int. Cl.
*H02K 16/00* (2006.01)
*H02K 11/21* (2016.01)
*H02K 11/00* (2016.01)

(52) U.S. Cl.
CPC ......... *H02K 16/00* (2013.01); *H02K 11/0031* (2013.01); *H02K 11/21* (2016.01)

(58) Field of Classification Search
CPC .............................. H02K 16/00; H02K 11/21
USPC .................. 310/68 B, 112, 114; 324/207.25; 318/49, 51, 113, 625, 652–661
See application file for complete search history.

(56) References Cited

U.S. PATENT DOCUMENTS

| | | | |
|---|---|---|---|
| 6,983,816 B2* | 1/2006 | Takahashi | B62D 5/006 180/402 |
| 7,688,017 B2* | 3/2010 | Hudgens | B25J 9/126 310/112 |
| 2004/0238257 A1 | 12/2004 | Takahashi et al. | |
| 2013/0154449 A1 | 6/2013 | Shen | |

FOREIGN PATENT DOCUMENTS

| | | |
|---|---|---|
| GB | 2255859 A | 11/1992 |
| JP | 2004-314891 A | 11/2004 |
| JP | 2009-292331 A | 12/2009 |
| JP | 2011-155717 A | 8/2011 |

OTHER PUBLICATIONS

Communication dated Aug. 23, 2016 from the Japanese Patent Office in counterpart Japanese application No. 2014-205432.

* cited by examiner

*Primary Examiner* — Jeremy Luks
(74) *Attorney, Agent, or Firm* — Sughrue Mion, PLLC

(57) ABSTRACT

A brushless motor includes a first motor unit and a second motor unit having a common rotary shaft and coupled to each other in an axial direction in which the rotary shaft extends, and two resolvers configured to respectively detect a rotation angle of the first motor unit and a rotation angle of the second motor unit. The two resolvers are arranged in the first motor unit.

8 Claims, 14 Drawing Sheets

BRUSHLESS MOTOR

INCORPORATION BY REFERENCE

The disclosure of Japanese Patent Application No. 2014-205432 filed on Oct. 6, 2014 including the specification, drawings and abstract is incorporated herein by reference in its entirety.

BACKGROUND OF THE INVENTION

1. Field of the Invention

The invention relates to a brushless motor and, more particularly to, a brushless motor including rotation angle detection units.

2. Description of Related Art

Generally, there is known a brushless motor including rotation angle detection units (see, for example, Japanese Patent Application Publication No. 2009-292331 (JP 2009-292331 A)).

JP 2009-292331 A describes a vehicle steering system including a first steering motor and a second steering motor that drive a steering shaft. In this vehicle steering system, the steering shaft is inserted through hollow shafts of the first and second steering motors. The steering shaft is configured to be driven (rotated) when one of the first and second steering motors is driven. Resolvers (a first resolver and a second resolver) are respectively provided in the first and second steering motors, and are configured to respectively detect the rotation angles of the first and second steering motors. The first and second resolvers are respectively arranged at one side and the other side of the steering shaft.

However, in the vehicle steering system described in JP 2009-292331 A, because the first and second resolvers are respectively arranged at one side and the other side of the steering shaft, cables (cable outlet ports) that are connected to the resolvers (rotation angle detection units) are arranged separately at one side and the other side of the steering shaft. For this reason, there is an inconvenience that routing of the cables (wiring) becomes complex.

SUMMARY OF THE INVENTION

The invention provides a brushless motor that is able to easily route cables that are respectively connected to rotation angle detection units.

An aspect of the invention provides a brushless motor. The brushless motor includes a first motor unit and a second motor unit having a common rotary shaft and coupled to each other in an axial direction in which the rotary shaft extends, and a first rotation angle detection unit and a second rotation angle detection unit configured to respectively detect a rotation angle of the first motor unit and a rotation angle of the second motor unit. The first rotation angle detection unit and the second rotation angle detection unit are arranged in the first motor unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

The configuration of a brushless motor 100 according to the present embodiment will be described with reference to FIG. 1 to FIG. 11. The brushless motor 100 is, for example, used in an actuator for controlling the chassis of a vehicle.

Figure 1:
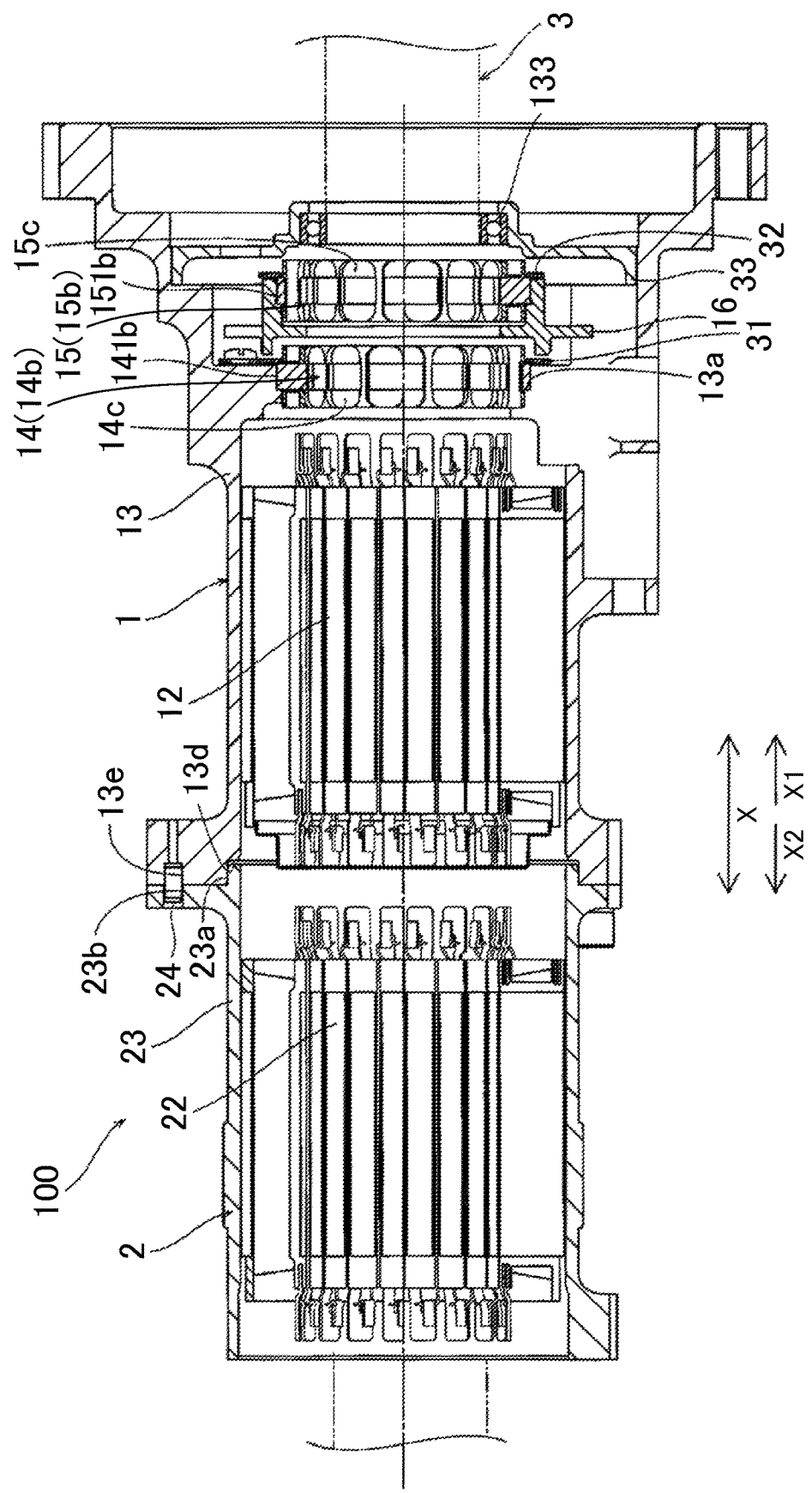
FIG. 1 is a cross-sectional view (cross-sectional view taken along the line 200-200 in FIG. 5) of a brushless motor according to an embodiment of the invention.
Figure 2:
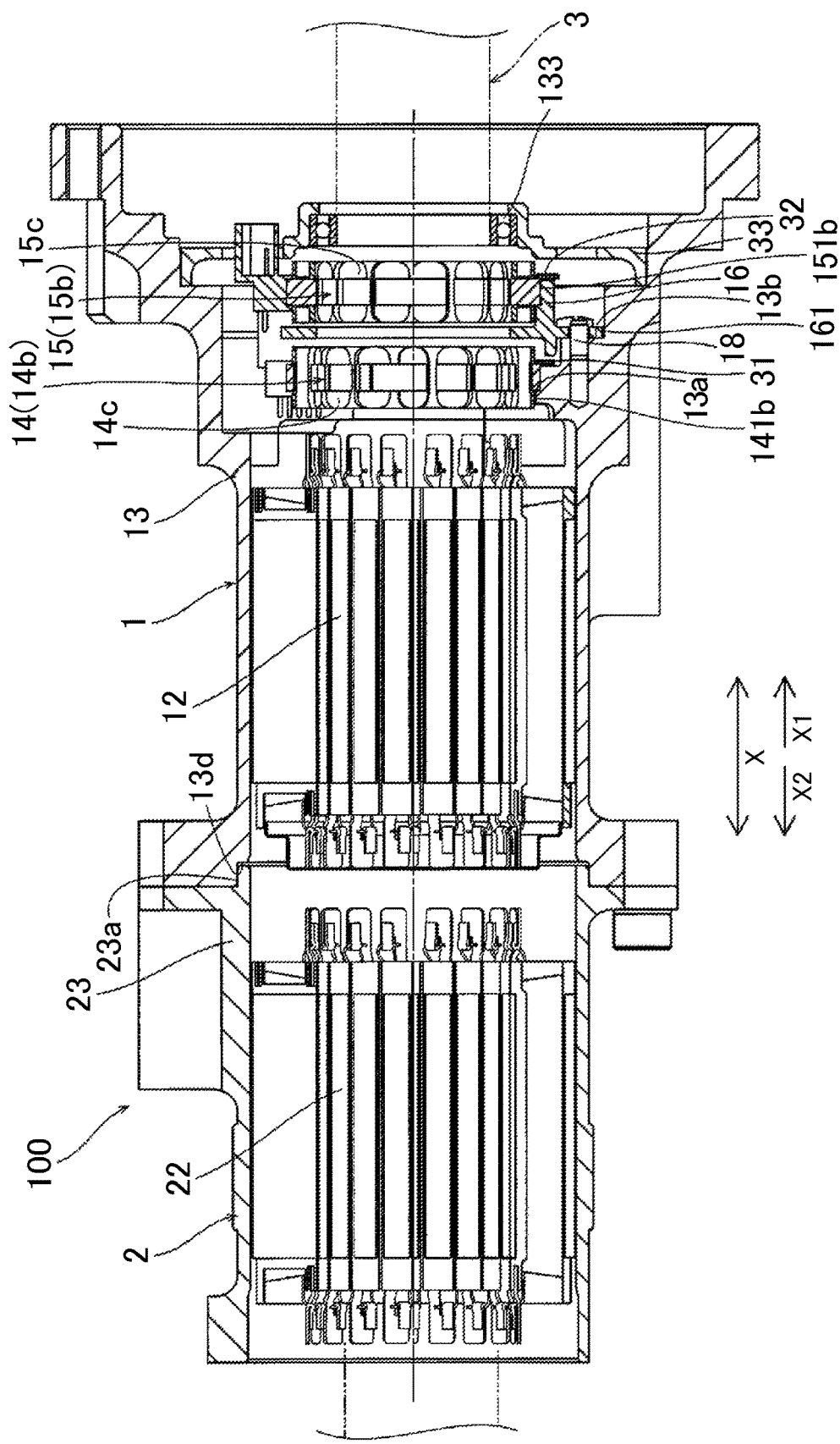
FIG. 2 is a cross-sectional view (cross-sectional view taken along the line 300-300 in FIG. 5) of the brushless motor according to the embodiment of the invention.

As shown in FIG. 1 and FIG. 2, the brushless motor 100 includes a first motor unit 1 and a second motor unit 2. The first motor unit 1 and the second motor unit 2 have a common rotary shaft 3 (see FIG. 3), and are coupled to each other in an axial direction (X direction) in which the rotary shaft 3 extends. Specifically, the first motor unit 1 is provided at an output side (X1 side) of the brushless motor 100. The second motor unit 2 is provided at an anti-output side (X2 side) of the brushless motor 100.

Figure 3:
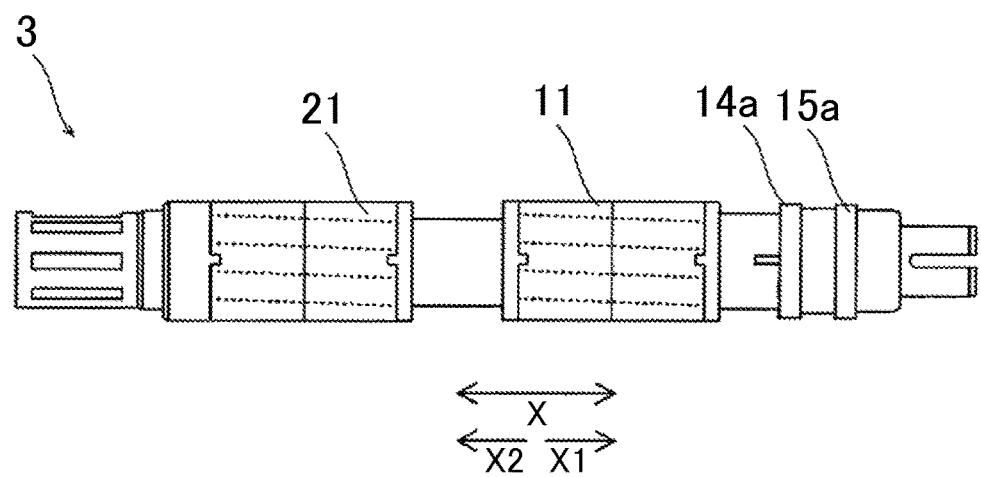
FIG. 3 is a side view of a rotary shaft of the brushless motor according to the embodiment of the invention.

As shown in FIG. 3, the first motor unit 1 includes a first rotor 11 provided on the rotary shaft 3. The first rotor 11 is directly fixed to the rotary shaft 3. A first stator 12 of the first motor unit 1 (see FIG. 1 and FIG. 2) is provided so as to surround the outer periphery of the first rotor 11. The first motor unit 1 includes a first motor case 13 in which the first stator 12 is arranged. The first motor case 13 has a cylindrical shape, and the first stator 12 is fixed to the inner face of the first motor case 13.

The brushless motor 100 includes a resolver 14 and a resolver 15. The resolver 14 detects the rotation angle of the second motor unit 2. The resolver 15 detects the rotation angle of the first motor unit 1. In the present embodiment, the resolver 14 and the resolver 15 are arranged in the first motor unit 1. The resolver 14 and the resolver 15 are arranged inside the first motor case 13 at a portion (output-side or X1-side portion) across the first stator 12 from the second motor unit 2. The resolver 15 is an example of a first rotation angle detection unit according to the invention. The resolver 14 is an example of a second rotation angle detection unit according to the invention.

Figure 4:
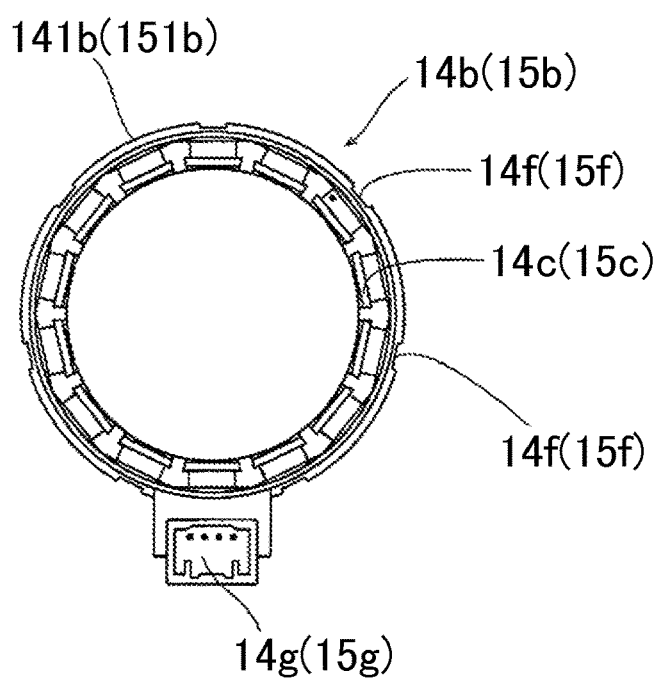
FIG. 4 is a front view of a resolver stator of the brushless motor according to the embodiment of the invention.

As shown in FIG. 3, the resolver 14 includes a resolver rotor 14a provided on the rotary shaft 3. As shown in FIG. 1, FIG. 2 and FIG. 4, the resolver 14 includes a resolver stator 14b arranged so as to surround the outer periphery of the resolver rotor 14a. The resolver rotor 14a is an example of a second rotation angle detection rotor according to the invention. The resolver stator 14b is an example of a second rotation angle detection stator according to the invention.

Figure 5:
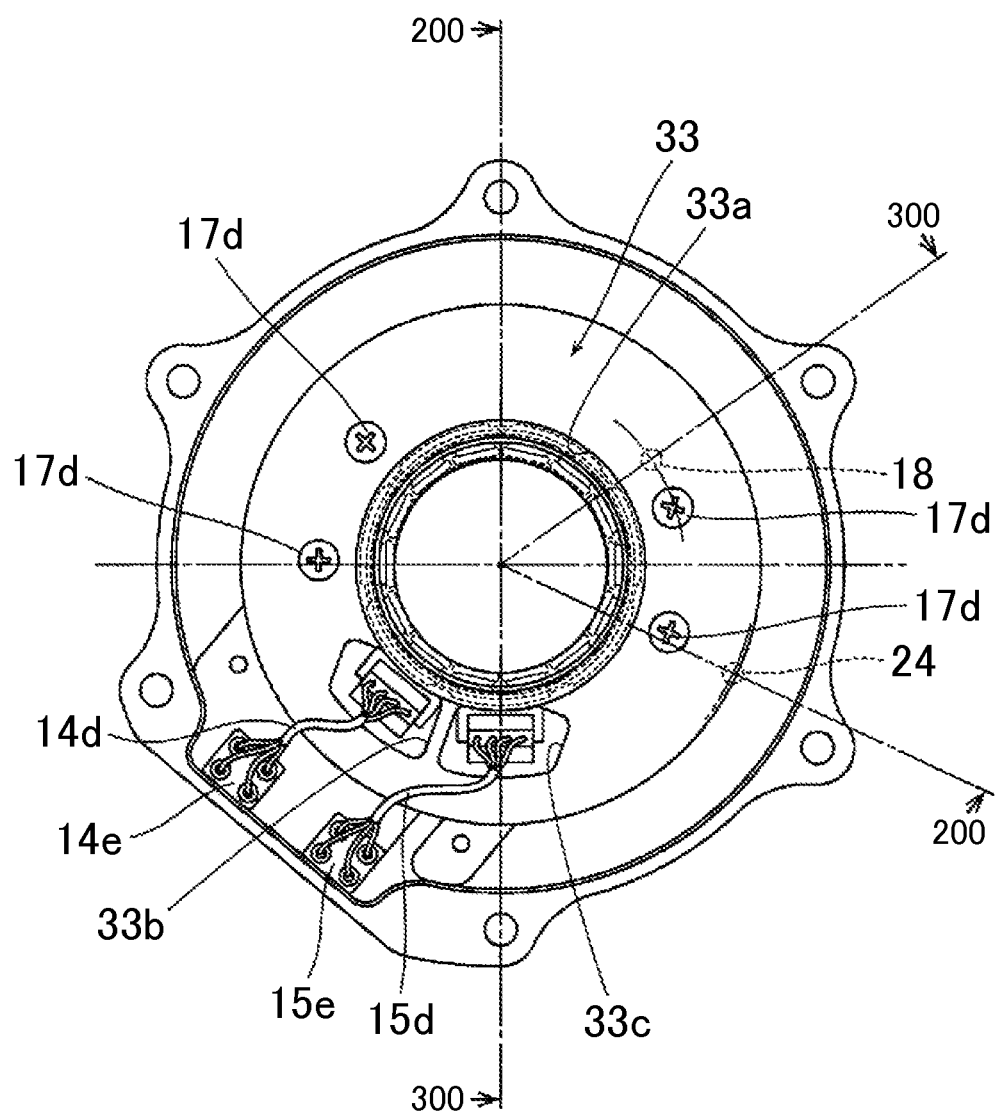
FIG. 5 is a view of the brushless motor according to the embodiment of the invention when viewed from a first case side.

As shown in FIG. 5, the resolver 14 includes a cable 14d to which voltage from coils 14c (see FIG. 4) of the resolver 14 is output. A waterproof grommet 14e is provided at the end of the cable 14d.

The resolver 15 has the same configuration as the resolver 14. That is, the resolver 15 includes a resolver rotor 15a (see FIG. 3) and a resolver stator 15b (see FIG. 1, FIG. 2 and FIG. 4). The resolver rotor 15a is provided on the rotary shaft 3. The resolver stator 15b is arranged so as to surround the outer periphery of the resolver rotor 15a. It is possible to detect the rotation angle of the rotary shaft 3 (first motor unit 1) by measuring an output voltage from coils 15c (see FIG. 4) wound in the resolver stator 15b at the time when the rotary shaft 3 (resolver rotor 15a) is rotating. As shown in FIG. 5, the resolver 15 includes a cable 15d through which voltage from the coils 15c of the resolver 15 is output. A waterproof grommet 15e is provided at the end of the cable 15d. The resolver rotor 15a is an example of a first rotation angle detection rotor according to the invention. The resolver stator 15b is an example of a first rotation angle detection stator according to the invention.

Figure 6:
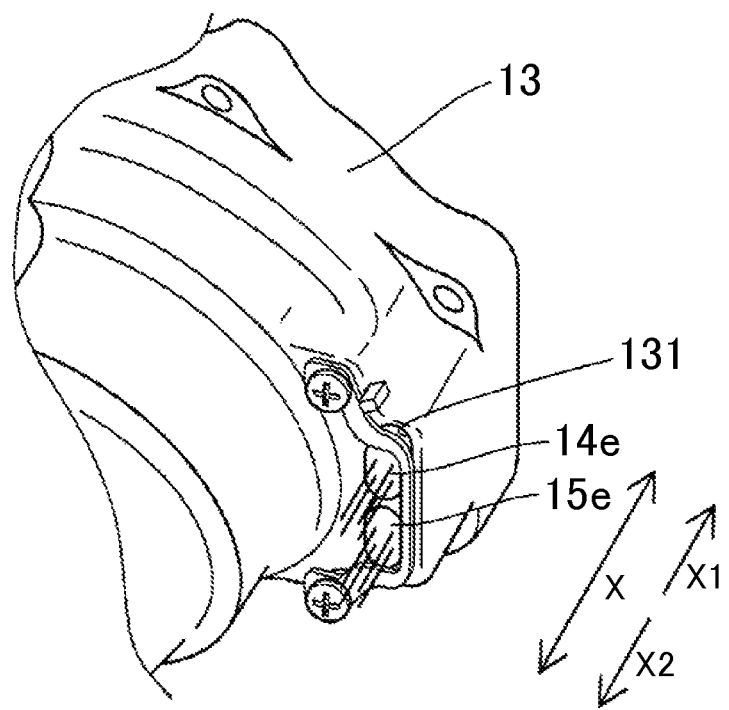
FIG. 6 is a view of the first case of the brushless motor according to the embodiment of the invention when viewed from a second case side.

As shown in FIG. 6, the waterproof grommet 14e and the waterproof grommet 15e are configured so as to be exposed from a single common hole 131 provided at the X2 side of the first motor case 13. Cables (not shown) are respectively connected to the waterproof grommet 14e and the waterproof grommet 15e through the common hole 131.

In the present embodiment, as shown in FIG. 1 and FIG. 2, the resolver 15 (the resolver rotor 15a and the resolver stator 15b) and the resolver 14 (the resolver rotor 14a and the resolver stator 14b) are arranged so as to be stacked on top of each other inside the first motor case 13. The resolver 14 (the resolver rotor 14a and the resolver stator 14b) is arranged inside the first motor case 13 at a portion closer to the second motor unit 2 (X2 side) than the resolver 15 (the resolver rotor 15a and the resolver stator 15b).

Figure 7:
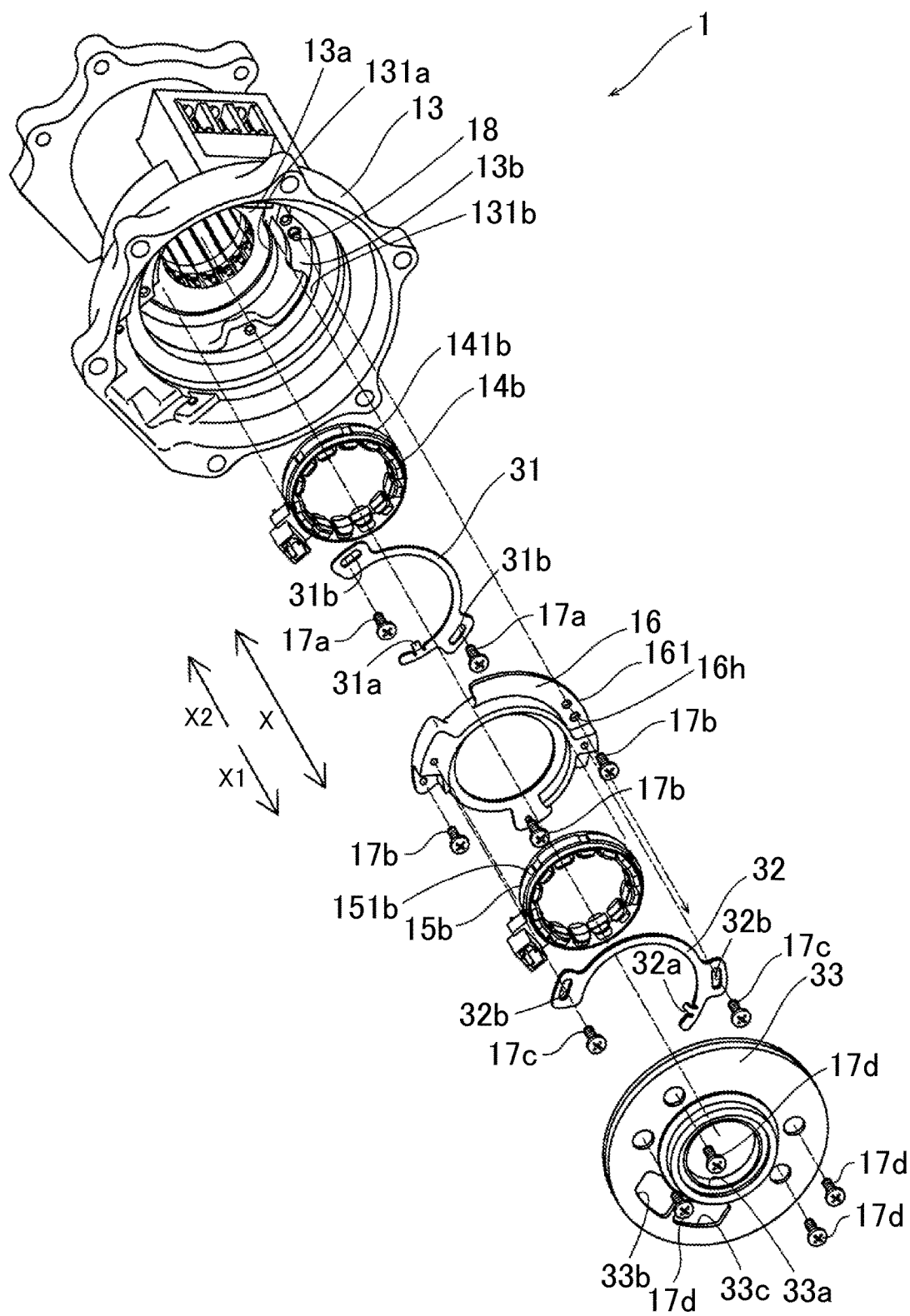
FIG. 7 is an exploded perspective view of the first case of the brushless motor according to the embodiment of the invention.

As shown in FIG. 1, FIG. 2 and FIG. 7, a circular step 13a is provided on the inner side of the first motor case 13. An outer periphery 141b of the resolver stator 14b is fitted to an inner periphery 131a of the step 13a. Thus, the resolver stator 14b is directly fixed to the first motor case 13.

In the present embodiment, a resolver case 16 is provided between the resolver 15 and the resolver 14. The resolver case 16 supports the resolver stator 15b. The resolver stator 15b is fixed to the first motor case 13 via the resolver case 16. The resolver case 16 is an example of a detection unit support member according to the invention.

Figure 8:
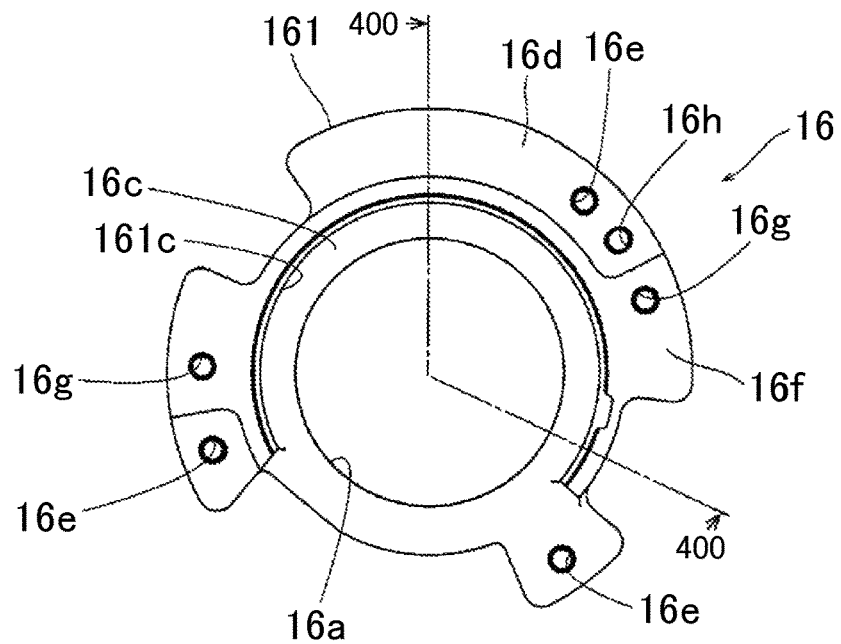
FIG. 8 is a front view of a resolver case of the brushless motor according to the embodiment of the invention.
Figure 9:
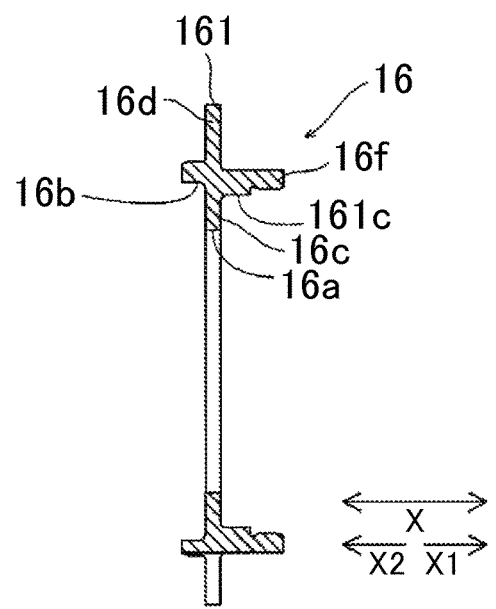
FIG. 9 is a cross-sectional view (cross-sectional view taken along the line 400-400 in FIG. 8) of the resolver case of the brushless motor according to the embodiment of the invention.

As shown in FIG. 8, the resolver case 16 is made of a metal, such as aluminum. The resolver case 16 has an annular shape, and has an opening 16a at its center. The rotary shaft 3 extends through the opening 16a. A step 16b (see FIG. 9) is provided at the X2 side (resolver 14 side) of the resolver case 16. The resolver stator 14b is fitted to the step 16b. A step 16c (see FIG. 9) is provided at the X1 side (resolver 15 side) of the resolver case 16. The resolver stator 15b is fitted to the step 16c. The resolver case 16 (a thin portion 16d having a small thickness) has a plurality of (three) threaded holes 16e for fixing the resolver case 16 to the first motor case 13 by screws 17b (see FIG. 7). The resolver case 16 (a thick portion 16f having a large thickness, see FIG. 9) has a plurality of (two) threaded holes 16g for fixing a plate member 32 (described later) to the resolver case 16 by screws 17c (see FIG. 7). The resolver case 16 has a positioning pin insertion hole 16h into which a positioning pin 18 (described later) is inserted.

As shown in FIG. 1 and FIG. 2, the resolver case 16 and the first motor case 13 have such a fitting structure that the axial center of the resolver 15 supported by the resolver case 16 is aligned with the axial center of the first stator 12 of the first motor unit 1 arranged in the first motor case 13. Specifically, as shown in FIG. 7, a circular step 13b is provided on the inner side of the first motor case 13, and an outer periphery 161 of the resolver case 16 is fitted to an inner periphery 131b of the step 13b.

In the present embodiment, as shown in FIG. 2 and FIG. 7, the brushless motor 100 includes the positioning pin 18 that positions the resolver case 16 and the first motor case 13 in the rotation direction. The positioning pin 18 is provided so as to protrude in the axial direction (toward the X1 side) from the step 13b to which the outer periphery 161 of the resolver case 16 is fitted. When the outer periphery 161 of the resolver case 16 is fitted to the inner periphery 131b of the step 13b such that the positioning pin 18 is inserted through (extends through) the positioning pin insertion hole 16h of the resolver case 16, the resolver case 16 and the first motor case 13 are positioned in the rotation direction. The resolver stator 15b is supported by the resolver case 16, so the resolver stator 15b is fixed to the first motor case 13 via the resolver case 16. The positioning pin 18 is an example of a first positioning member according to the invention.

Figure 10:
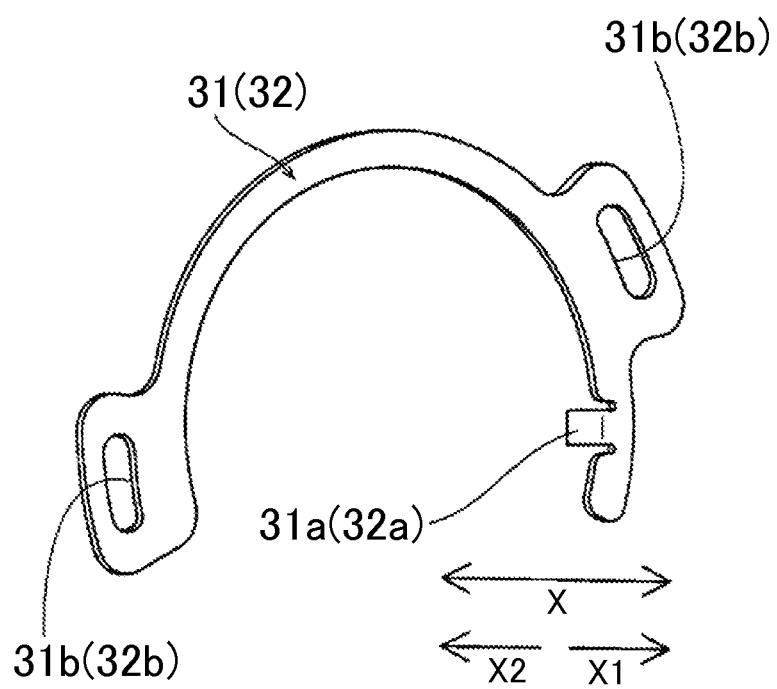
FIG. 10 is a perspective view of a plate member of the brushless motor according to the embodiment of the invention.

As shown in FIG. 1, FIG. 2 and FIG. 10, the brushless motor 100 includes a plate member 31 and a plate member 32. The plate member 31 is used to fix the resolver stator 14b to the first motor case 13. The plate member 32 is used to fix the resolver stator 15b to the resolver case 16. The plate member 32 and the plate member 31 are made of a metal, such as iron.

As shown in FIG. 10, the plate member 31 has a substantially circular arc shape in plan view. The plate member 31 has a tab 31a. The tab 31a is configured to be engaged with any one of a plurality of grooves 14f (see FIG. 4) provided on the outer periphery 141b of the resolver stator 14b along the axial direction. The tab 31a is provided so as to protrude in the axial direction (toward the X2 side) perpendicular to the surface of the plate member 31. The plate member 31 has a plurality of (two) threaded holes 31b.

Each threaded hole 31*b* has an oblong shape. The phase of the resolver stator 14*b* (resolver 14) is allowed to be adjusted by rotating the plate member 31 around the axis in a state where the tab 31*a* of the plate member 31 is engaged with any one of the groove 14*f* of the resolver stator 14*b*.

The plate member 32 has a similar configuration to that of the plate member 31. That is, the plate member 32 has a tab 32*a* and oblong threaded holes 32*b*. The tab 32*a* is engaged with any one of a plurality of grooves 15*f* (see FIG. 4) provided on an outer periphery 151*b* of the resolver stator 15*b* along the axial direction.

As shown in FIG. 1 and FIG. 2, the brushless motor 100 includes a bearing member 33 so as to cover the X1-side opening of the first motor case 13. A bearing 133 is fixed to the bearing member 33. The bearing 133 supports the rotary shaft 3 such that the rotary shaft 3 is rotatable. As shown in FIG. 5, the bearing member 33 has an annular shape, and has an opening 33*a* at its center. The rotary shaft 3 extends through the opening 33*a*. The bearing member 33 has a cable outlet port 33*b* for drawing the cable 14*d* of the resolver 14, and also has a cable outlet port 33*c* for drawing the cable 15*d* of the resolver 15. The cable 14*d* is configured to be drawn (routed) to the outside (output side or X1 side) of the first motor case 13 via the cable outlet port 33*b*. The cable 15*d* is configured to be drawn (routed) to the outside (output side or X1 side) of the first motor case 13 via the cable outlet port 33*c*. The cable outlet port 33*b* and the cable outlet port 33*c* are arranged next to each other in the circumferential direction.

As shown in FIG. 3, the second motor unit 2 includes a second rotor 21 provided on the rotary shaft 3. The second rotor 21 is directly fixed to the rotary shaft 3. A second stator 22 of the second motor unit 2 (see FIG. 1 and FIG. 2) is provided so as to surround the outer periphery of the second rotor 21. The second motor unit 2 includes a second motor case 23 in which the second stator 22 is arranged. The second motor case 23 has a cylindrical shape, and the second stator 22 is fixed to the inner face of the second motor case 23.

Figure 11:
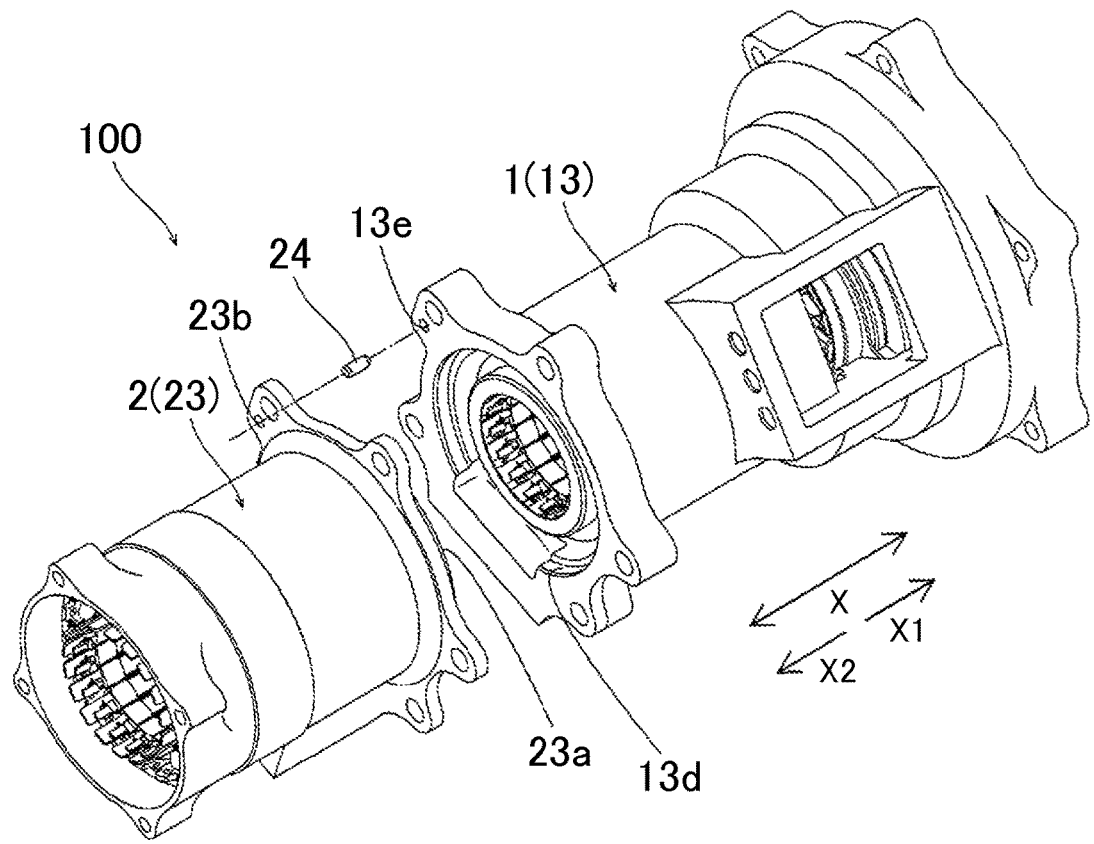
FIG. 11 is an exploded perspective view of the brushless motor according to the embodiment of the invention.

As shown in FIG. 1, FIG. 2 and FIG. 11, the first motor case 13 and the second motor case 23 have such a fitting structure that the axial center of the resolver 14 arranged in the first motor case 13 is aligned with the axial center of the second stator 22 arranged in the second motor case 23. Specifically, a fitting recess 13*d* is provided at the X2-side end of the first motor case 13. A fitting protrusion 23*a* is provided at the X1-side end of the second motor case 23. The axial center of the resolver 14 (resolver stator 14*b*) arranged in the first motor case 13 is aligned with the axial center of the second stator 22 arranged in the second motor case 23 by fitting the fitting protrusion 23*a* of the second motor case 23 to the fitting recess 13*d* of the first motor case 13.

In the present embodiment, as shown in FIG. 1 and FIG. 11, the brushless motor 100 includes a positioning pin 24 that positions the first motor case 13 and the second motor case 23 in the rotation direction. The positioning pin 24 is configured to be fitted to a positioning pin insertion hole 13*e* and a positioning pin insertion hole 23*b*. The positioning pin insertion hole 13*e* is provided at the X2-side end of the first motor case 13. The positioning pin insertion hole 23*b* is provided at the X1-side end of the second motor case 23. The first motor case 13 and the second motor case 23 are positioned in the rotation direction by fitting the fitting recess 13*d* of the first motor case 13 and the fitting protrusion 23*a* of the second motor case 23 via the positioning pin 24. The positioning pin 24 is an example of a second positioning member according to the invention.

With the above configuration, the resolver 15 and the first stator 12 of the first motor unit 1 are positioned (aligned in phase) via three members, that is, the resolver case 16, the positioning pin 18 and the first motor case 13. The resolver 14 and the second stator 22 of the second motor unit 2 are positioned (aligned in phase) via three members, that is, the first motor case 13, the positioning pin 24 and the second motor case 23.

Next, the procedure of assembling the resolver 15 and the resolver 14 will be described with reference to FIG. 12 to FIG. 16.

Figure 12:
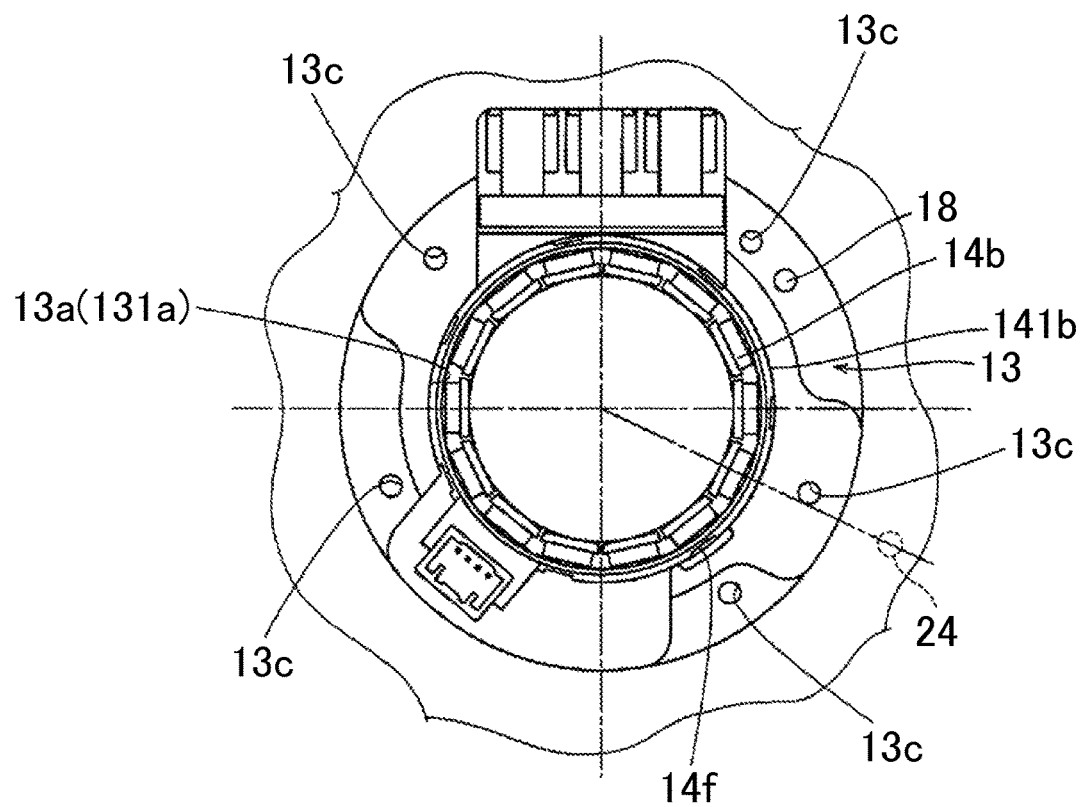
FIG. 12 is a view for illustrating the procedure of assembling a resolver of the brushless motor according to the embodiment of the invention (a state where a resolver that detects a rotation angle of a second motor unit is installed)

As shown in FIG. 12, the outer periphery 141*b* of the resolver stator 14*b* is fitted to the inner periphery 131*a* of the step 13*a* of the first motor unit 1 such that the phases are matched with each other with reference to the positioning pin 24.

Figure 13:
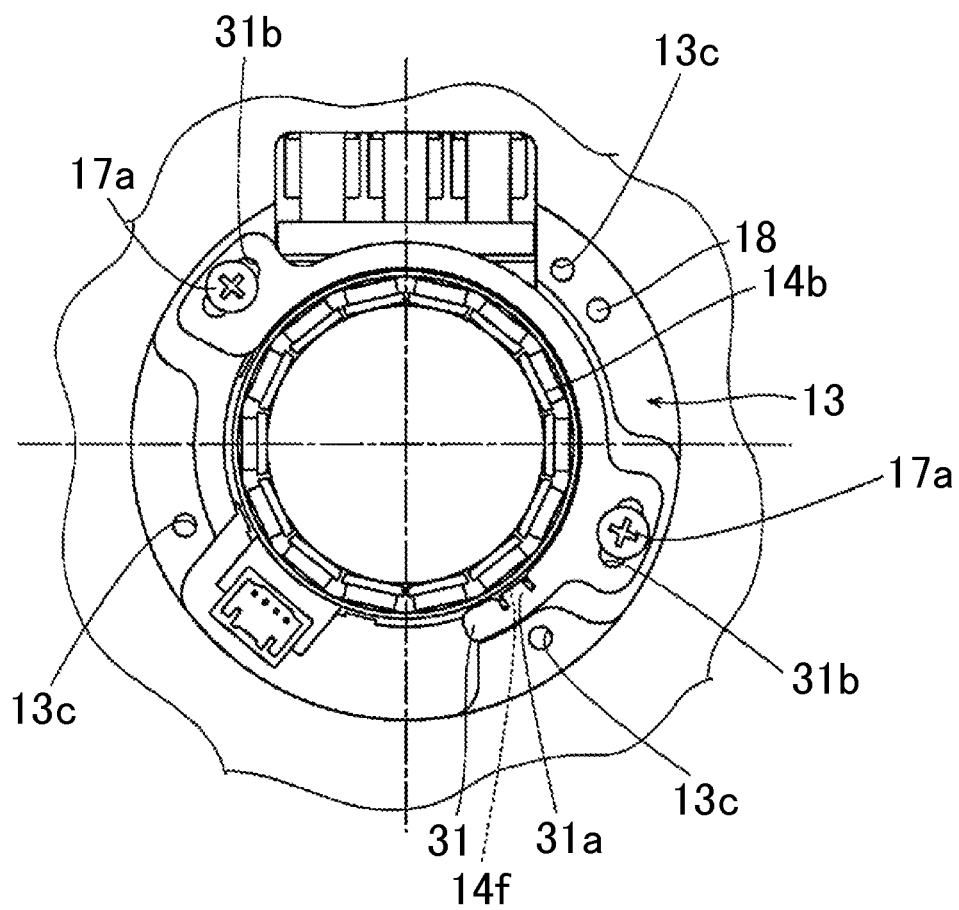
FIG. 13 is a view for illustrating the procedure of assembling the resolver of the brushless motor according to the embodiment of the invention (a state where the plate member is installed)

Subsequently, as shown in FIG. 13, the plate member 31 is arranged on the surface of the resolver stator 14*b* such that the tab 31*a* of the plate member 31 is engaged with any one of the grooves 14*f* of the resolver stator 14*b*. The plate member 31 is fixed to the first motor case 13 by screwing the screws 17*a* to threaded holes 13*c* (see FIG. 12) of the first motor case 13 via the threaded holes 31*b* of the plate member 31.

Figure 14:
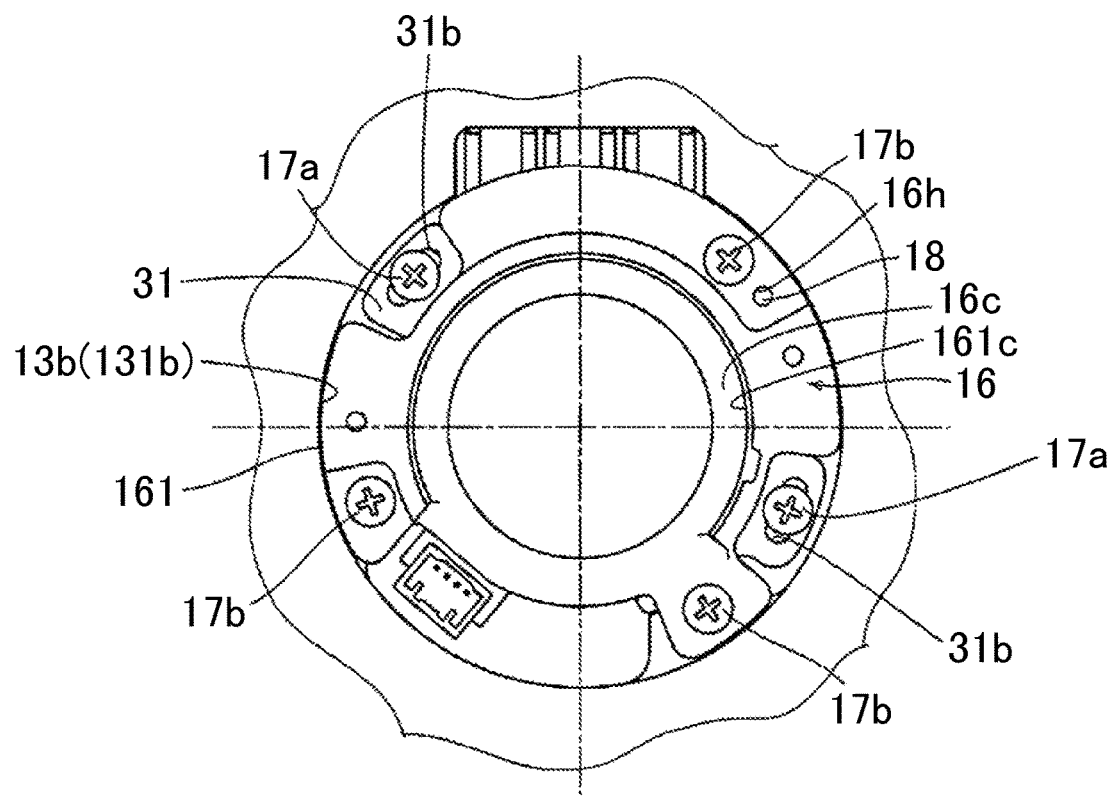
FIG. 14 is a view for illustrating the procedure of assembling the resolver of the brushless motor according to the embodiment of the invention (a state where the resolver case is installed)

Subsequently, as shown in FIG. 14, the outer periphery 161 of the resolver case 16 is fitted to the inner periphery 131*b* of the step 13*b* of the first motor case 13 (the X1 side of the resolver stator 14*b*) by inserting the positioning pin 18 into the positioning pin insertion hole 16*h* of the resolver case 16. Thus, the resolver case 16 and the first motor case 13 are positioned in the rotation direction. The resolver case 16 is fixed to the first motor case 13 by screwing the screws 17*b* to the threaded holes 13*c* of the first motor case 13 via the threaded holes 16*e* (see FIG. 8) of the resolver case 16.

Figure 15:
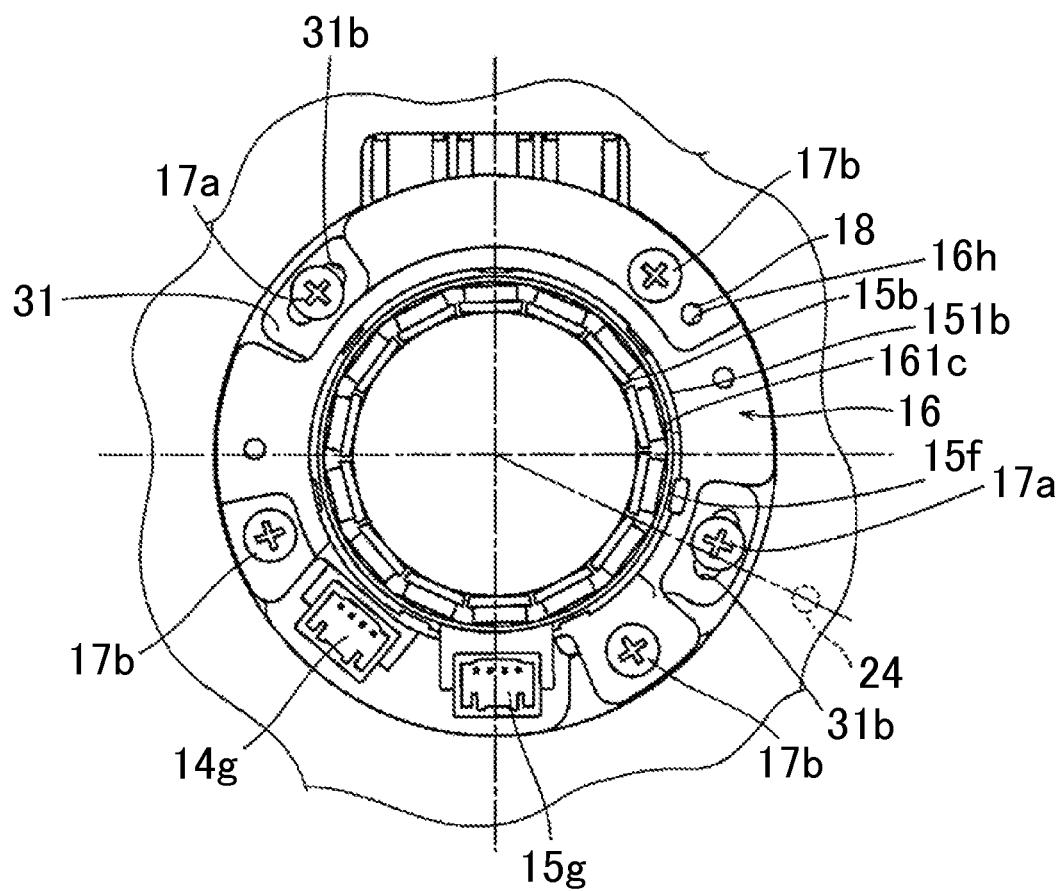
FIG. 15 is a view for illustrating the procedure of assembling the resolver of the brushless motor according to the embodiment of the invention (a state where a resolver that detects a rotation angle of a first motor unit is installed)

Subsequently, as shown in FIG. 15, the outer periphery 151*b* of the resolver stator 15*b* is fitted to the inner periphery 161*c* of the step 16*c* of the resolver case 16 such that the phases are matched with each other with reference to the positioning pin 24. Thus, the axial center of the resolver stator 15*b* and the axial center of the first stator 12 are configured to coincide with each other by a fit (faucet) between the resolver case 16 and the first motor case 13. In the present embodiment, the resolver stator 14*b* and the resolver stator 15*b* are fixed in a state where the phase of the resolver 14 and the phase of the resolver 15 are shifted from each other by substantially 45 degrees. Thus, when viewed in the axial direction, a cable connection portion 14*g* of the resolver 14 and a cable connection portion 15*g* of the resolver 15 are exposed. As a result, it is possible to easily connect the cable 14*d* to the resolver 14, and it is possible to easily connect the cable 15*d* to the resolver 15.

Figure 16:
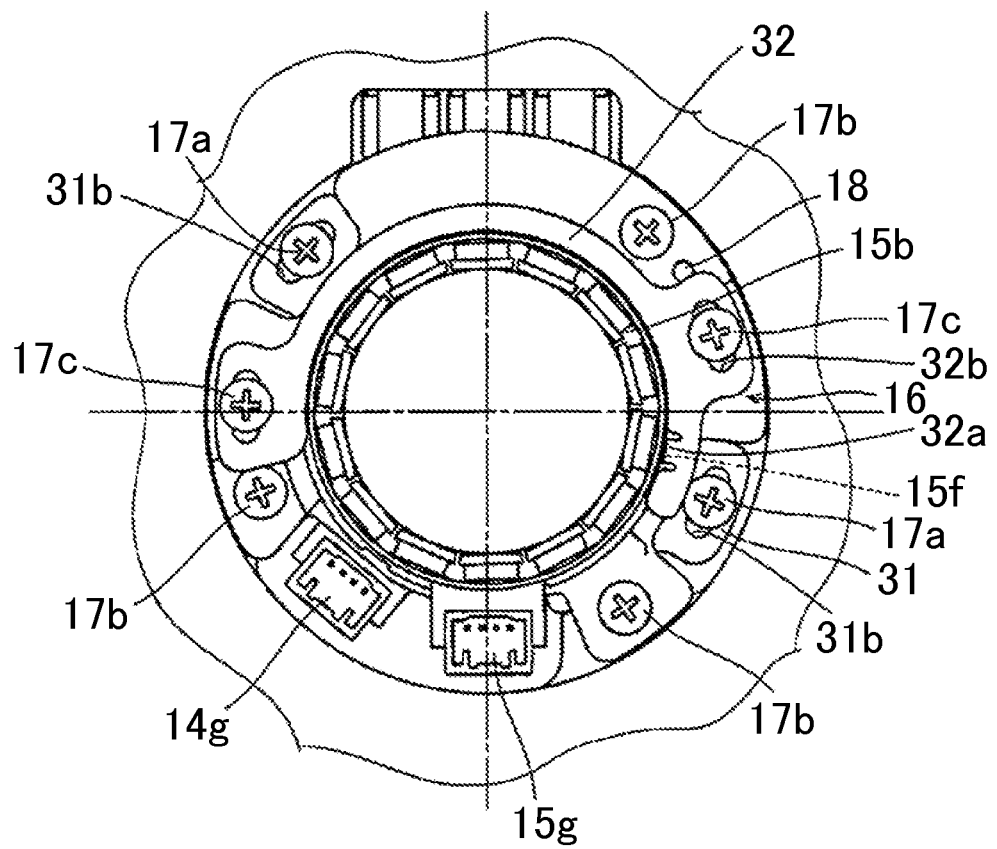
FIG. 16 is a view for illustrating the procedure of assembling the resolver of the brushless motor according to the embodiment of the invention (a state where the plate member is installed).

Subsequently, as shown in FIG. 16, the plate member 32 is arranged on the surface of the resolver stator 15*b* such that the tab 32*a* of the plate member 32 is engaged with any one of the grooves 15*f* of the resolver stator 15*b*. The plate member 32 is fixed to the resolver case 16 by screwing the screws 17*c* to the threaded holes 16*g* (see FIG. 8) of the resolver case 16 via the threaded holes 32*b* of the plate member 32.

As shown in FIG. 5, the bearing member 33 is fixed by screws 17*d*. The cable 14*d* is connected via the cable outlet port 33*b*, and the cable 15*d* is connected via the cable outlet port 33*c*. As shown in FIG. 6, the waterproof grommet 14*e* and the waterproof grommet 15e are arranged in the hole 131. Thus, assemblage of the resolver 14 and the resolver 15 completes.

When the positional relationship (phases) around the rotary shaft among the resolver 14, the resolver 15, the first motor unit 1 and the second motor unit 2 does not satisfy a desired positional relationship, the timing of supplying electric power to each of the first motor unit 1 and the second motor unit 2 does not coincide with desired timing, and the first motor unit 1 and the second motor unit 2 do not rotate normally. Even when the cable 14d of the resolver 14 and the cable 15d of the resolver 15 are mixed up and connected, the first motor unit 1 and the second motor unit 2 do not rotate normally, so it is possible to detect a mistake in connection of the cable 14d and the cable 15d even after completion of assemblage of the brushless motor 100.

According to the present embodiment, the following advantageous effects are obtained.

In the present embodiment, as described above, the cable 15d connected to the resolver 15 and the cable 14d connected to the resolver 14 are concentrated to one side of the rotary shaft 3 by arranging the resolver 15 and the resolver 14 in the first motor unit 1, so it is possible to easily route the cable 15d and the cable 14d (wiring). Adjustment of the phases, and the like, of the resolver 15 and resolver 14 is allowed from one side in the axial direction by arranging the resolver 15 and the resolver 14 in the first motor unit 1, so it is possible to improve the workability of work for adjusting the phases, and the like. With the configuration that the first motor unit 1 and the second motor unit 2 have the common rotary shaft 3, different from the case where the first motor unit 1 and the second motor unit 2 each include the rotary shaft 3 individually, it is possible to suppress misalignment of the rotation axis centers of the first motor unit 1 and second motor unit 2.

In the present embodiment, as described above, the first motor unit 1 includes the first rotor 11 provided on the rotary shaft 3, the first stator 12 arranged so as to surround the outer periphery of the first rotor 11, and the first motor case 13 in which the first stator 12 is arranged, and the resolver 15 and the resolver 14 are arranged inside the first motor case 13 at the portion across the first stator 12 from the second motor unit 2. Thus, because the resolver 15 and the resolver 14 are arranged at one axial end of the first motor case 13, it is possible to further easily route the cable 15d and the cable 14d (wiring).

In the present embodiment, as described above, the resolver 15 includes the resolver rotor 15a provided on the rotary shaft 3 and the resolver stator 15b arranged so as to surround the outer periphery of the resolver rotor 15a, the resolver 14 includes the resolver rotor 14a provided on the rotary shaft 3 and the resolver stator 14b arranged so as to surround the outer periphery of the resolver rotor 14a, and the pair of resolver rotor 15a and resolver stator 15b and the pair of resolver rotor 14a and resolver stator 14b are arranged inside the first motor case 13 so as to be stacked on top of each other. Thus, it is possible to easily arrange both the resolver 15 and the resolver 14 inside the first motor case 13 at the portion across the first stator 12 from the second motor unit 2.

In the present embodiment, as described above, the resolver 14 is arranged inside the first motor case 13 at the portion closer to the second motor unit 2 than the resolver 15, the resolver case 16 that supports the resolver stator 15b is provided, the resolver stator 15b is fixed to the first motor case 13 via the resolver case 16, and the resolver stator 14b is directly fixed to the first motor case 13. Thus, it is possible to stack the resolver stator 15b on top of the resolver stator 14b in the axial direction via the resolver case 16 while suppressing contact between the resolver stator 15b and the resolver stator 14b by the use of the resolver case 16. It is possible to easily fix the resolver stator 15b, which is arranged inside the first motor case 13 at the portion closer to one end side in the axial direction (axially outer side) than the resolver stator 14b, to the first motor case 13 by the use of the resolver case 16.

In the present embodiment, as described above, the positioning pin 18 that positions the resolver case 16 and the first motor case 13 in the rotation direction is provided. Thus, it is possible to position the resolver stator 15b, which is fixed to the resolver case 16, in the rotation direction by the use of the positioning pin 18 via the resolver case 16. As a result, it is possible to set the phase of the resolver 15 with respect to the first motor case 13 (first motor unit 1).

In the present embodiment, as described above, the second motor unit 2 includes the second rotor 21 provided on the rotary shaft 3, the second stator 22 arranged so as to surround the outer periphery of the second rotor 21, and the second motor case 23 in which the second stator 22 is arranged, and the positioning pin 24 that positions the first motor case 13 and the second motor case 23 in the rotation direction is provided. Thus, it is possible to position the resolver stator 14b, which is directly fixed to the first motor case 13, with respect to the second motor case 23 in the rotation direction by the use of the positioning pin 24. As a result, it is possible to set the phase of the resolver 14 with respect to the second motor case 23 (second motor unit 2).

The embodiment described above is illustrative and not restrictive in all respects. The scope of the invention is defined by the appended claims rather than the description of the above-described embodiment. The scope of the invention encompasses all modifications (alternative embodiments) within the scope of the appended claims and equivalents thereof.

For example, in the example of the above-described embodiment, the resolvers 14, 15 are arranged inside the first motor case 13 at the portion (output-side or X1-side portion) across the first stator 12 from the second motor unit 2; however, the invention is not limited to this configuration. In the invention, the resolvers 14, 15 may be arranged inside the first motor case 13 at a portion other than the portion (output-side or X1-side portion) across the first stator 12 from the second motor unit 2. For example, the resolvers 14, 15 may be arranged inside the first motor case 13 at a portion closer to the second motor unit 2 (X2 side) than the first stator 12.

In the example of the above-described embodiment, the resolvers 14, 15 have mutually similar configurations (the same resolvers); however, the invention is not limited to this configuration. For example, the resolvers 14, 15 may have mutually different configurations.

In the example of the above-described embodiment, the resolver 15 is arranged so as to be stacked on top of the resolver 14 via the resolver case 16; however, the invention is not limited to this configuration. For example, the resolver 15 may be arranged directly on top of the resolver 14 by directly fixing the resolver 15 to the first motor case 13.

In the example of the above-described embodiment, the first motor case 13 has the positioning pin 18 that positions the resolver case 16 and the first motor case 13 in the rotation direction; however, the invention is not limited to this configuration. For example, the resolver case 16 and the first motor case 13 may be positioned in the rotation direction by the use of a member other than the positioning pin 18.

In the example of the above-described embodiment, the positioning pin 24 that fits the first motor case 13 and the second motor case 23 to each other is provided in order to position the first motor case 13 and the second motor case 23 in the rotation direction; however, the invention is not limited to this configuration. For example, the first motor case 13 and the second motor case 23 may be configured to be positioned in the rotation direction by the use of a member other than the positioning pin 24.

In the example of the above-described embodiment, the brushless motor includes the two motor units (the first motor unit 1 and the second motor unit 2); however, the invention is not limited to this configuration. For example, the brushless motor may include three or more motor units. In this case, resolvers are also provided commensurately with the number of the motor units.

In the example of the above-described embodiment, the resolver is used as each of the rotation angle detection units (the first rotation angle detection unit and the second rotation angle detection unit) according to the invention; however, the invention is not limited to this configuration. In the invention, a rotation angle detection unit other than the resolver may be provided.

In the example of the above-described embodiment, the bearing member 33 includes the two cable outlet ports 33b, 33c; however, the invention is not limited to this configuration. For example, the bearing member 33 may include a single (common) cable outlet port, and the cables of the two resolvers 14, 15 may be configured to be drawn from the single cable outlet port.

The above-described embodiment may be configured as follows. A brushless motor 100 according to the above-described embodiment includes a first motor unit 1 and a second motor unit 2 having a common rotary shaft 3 and coupled to each other in an axial direction in which the rotary shaft 3 extends, and a first rotation angle detection unit 15 and a second rotation angle detection unit 14 configured to respectively detect a rotation angle of the first motor unit 1 and a rotation angle of the second motor unit 2. The first rotation angle detection unit 15 and the second rotation angle detection unit 14 are arranged in the first motor unit 1.

With the brushless motor 100, as described above, it is possible to concentrate a cable connected to the first rotation angle detection unit 15 and a cable connected to the second rotation angle detection unit 14 to one side of the rotary shaft 3 by arranging the first rotation angle detection unit 15 and the second rotation angle detection unit 14 in the first motor unit 1, so it is possible to easily route the cables (wiring). Adjustment of the phases, and the like, of the first rotation angle detection unit 15 and second rotation angle detection unit 14 is allowed from one side in the axial direction by arranging the first rotation angle detection unit 15 and the second rotation angle detection unit 14 in the first motor unit 1, so it is possible to improve the workability of work for adjusting the phases, and the like. With the configuration that the first motor unit 1 and the second motor unit 2 have the common rotary shaft 3, different from the case where the first motor unit 1 and the second motor unit 2 each include the rotary shaft individually, it is possible to suppress misalignment of the rotation axis centers of the first motor unit 1 and second motor unit 2.

In the brushless motor 100, the first motor unit 1 may include a first rotor 11 provided on the rotary shaft 3, a first stator 12 arranged so as to surround an outer periphery of the first rotor 11, and a first motor case 13 in which the first stator 12 is arranged, and the first rotation angle detection unit 15 and the second rotation angle detection unit 14 may be arranged inside the first motor case 13 at a portion across the first stator 12 from the second motor unit 2. With this configuration, because the first rotation angle detection unit 15 and the second rotation angle detection unit 14 are arranged at one axial end of the first motor case 13, it is possible to further easily route the cables (wiring).

In this case, the first rotation angle detection unit 15 may include a first rotation angle detection rotor 15a provided on the rotary shaft 3 and a first rotation angle detection stator 15b arranged so as to surround an outer periphery of the first rotation angle detection rotor 15a, the second rotation angle detection unit 14 may include a second rotation angle detection rotor 14a provided on the rotary shaft 3 and a second rotation angle detection stator 14b arranged so as to surround an outer periphery of the second rotation angle detection rotor 14a, and a pair of first rotation angle detection rotor 15a and first rotation angle detection stator 15b and a pair of second rotation angle detection rotor 14a and second rotation angle detection stator 14b may be arranged so as to be stacked on top of each other inside the first motor case 13. With this configuration, it is possible to easily arrange both the first rotation angle detection unit 15 and the second rotation angle detection unit 14 inside the first motor case 13 at the portion across the first stator 12 from the second motor unit 2.

In the brushless motor 100 in which the pair of first rotation angle detection rotor 15a and first rotation angle detection stator 15b and the pair of second rotation angle detection rotor 14a and second rotation angle detection stator 14b are arranged so as to be stacked on top of each other, the second rotation angle detection unit 14 may be arranged inside the first motor case 13 at a portion closer to the second motor unit 2 than the first rotation angle detection unit 15, the brushless motor 100 may further include a detection unit support member 16 that supports the first rotation angle detection stator 15b, the first rotation angle detection stator 15b may be fixed to the first motor case 13 via the detection unit support member 16, and the second rotation angle detection stator 14b may be directly fixed to the first motor case 13. With this configuration, it is possible to stack the first rotation angle detection stator 15b on top of the second rotation angle detection stator 14b in the axial direction via the detection unit support member 16 while suppressing contact between the first rotation angle detection stator 15b and the second rotation angle detection stator 14b by the use of the detection unit support member 16. It is possible to easily fix the first rotation angle detection stator 15b, which is arranged inside the first motor case 13 at a portion closer to one end side in the axial direction (axially outer side) than the second rotation angle detection stator 14b, to the first motor case 13 by the use of the detection unit support member 16.

In this case, the brushless motor 100 may further include a first positioning member 18 that positions the detection unit support member 16 and the first motor case 13 in a rotation direction. With this configuration, it is possible to position the first rotation angle detection stator 15b, which is fixed to the detection unit support member 16, in the rotation direction by the use of the first positioning member 18 via the detection unit support member 16. Thus, it is possible to set the phase of the first rotation angle detection unit 15 with respect to the first motor case 13 (first motor unit 1).

In the brushless motor 100 in which the first rotation angle detection unit 15 and the second rotation angle detection unit 14 are arranged at the portion across the first stator 12 from the second motor unit 2, the second motor unit 2 may include a second rotor 21 provided on the rotary shaft 3, a second stator 22 arranged so as to surround an outer periphery of the second rotor 21, and a second motor case 23 in which the second stator 22 is arranged, and the brushless motor 100 may further include a second positioning member 24 that positions the first motor case 13 and the second motor case 23 in a rotation direction. With this configuration, it is possible to position the second rotation angle detection stator 14b, which is directly fixed to the first motor case 13, with respect to the second motor case 23 in the rotation direction by the use of the second positioning member 24. Thus, it is possible to set the phase of the second rotation angle detection unit 14 with respect to the second motor case 23 (second motor unit 2).

Different from the above-described brushless motor, the following other configurations are also conceivable.

That is, the brushless motor 100 may further include a first fixing member 32 that fixes the first rotation angle detection stator 15b to the detection unit support member 16, and a second fixing member 31 that fixes the second rotation angle detection stator 14b to the first motor case 13. With this configuration, it is possible to reliably fix the first rotation angle detection stator 15b to the detection unit support member 16 by the use of the first fixing member 32, and it is possible to reliably fix the second rotation angle detection stator 14b to the first motor case 13 by the use of the second fixing member 31.

In the brushless motor 100, the first motor case 13 may include cable outlet ports 33c, 33b for drawing a cable of the first rotation angle detection unit 15 and a cable of the second rotation angle detection unit 14. With this configuration, because it is possible to draw the cable of the first rotation angle detection unit 15 and the cable of the second rotation angle detection unit 14 via the cable outlet ports 33c, 33b of the first motor case 13, different from the case where the cables are respectively drawn from the first motor case and the second motor case, it is possible to further easily route the cables (wiring).

In the brushless motor 100, the detection unit support member 16 and the first motor case 13 may have a fitting structure that aligns an axial center of the first rotation angle detection unit 15 supported by the detection unit support member 16 with an axial center of the first stator 12 arranged in the first motor case 13. With this configuration, it is possible to easily suppress misalignment between the axial center of the first rotation angle detection unit 15 supported by the detection unit support member 16 and the axial center of the first stator 12 arranged in the first motor case 13 by the use of the fitting structure.

In the brushless motor 100, the first motor case 13 and the second motor case 23 may have a fitting structure that aligns an axial center of the second rotation angle detection unit 14 arranged in the first motor case 13 with an axial center of the second stator 22 arranged in the second motor case 23. With this configuration, it is possible to further easily suppress misalignment between the axial center of the second rotation angle detection unit 14 arranged in the first motor case 13 and the axial center of the second stator 22 arranged in the second motor case 23 by the use of the fitting structure.

With the above-described configurations, it is possible to easily route the cables respectively connected to the rotation angle detection units.

What is claimed is:

1. A brushless motor comprising:
a first motor unit and a second motor unit having a common rotary shaft and coupled to each other in an axial direction in which the rotary shaft extends; and
a first rotation angle detection unit and a second rotation angle detection unit configured to respectively detect a rotation angle of the first motor unit and a rotation angle of the second motor unit, the first rotation angle detection unit and the second rotation angle detection unit being arranged in the first motor unit, wherein:
the first motor unit includes a first rotor provided on the rotary shaft, a first stator arranged so as to surround an outer periphery of the first rotor, and a first motor case in which the first stator is arranged; and
the first rotation angle detection unit and the second rotation angle detection unit are arranged inside the first motor case at a portion across the first stator from the second motor unit, and, wherein:
the first rotation angle detection unit includes a first rotation angle detection rotor provided on the rotary shaft and a first rotation angle detection stator arranged so as to surround an outer periphery of the first rotation angle detection rotor;
the second rotation angle detection unit includes a second rotation angle detection rotor provided on the rotary shaft and a second rotation angle detection stator arranged so as to surround an outer periphery of the second rotation angle detection rotor; and
a pair of first rotation angle detection rotor and first rotation angle detection stator and a pair of second rotation angle detection rotor and second rotation angle detection stator are arranged so as to be stacked on top of each other inside the first motor case, and wherein:
the second rotation angle detection unit is arranged inside the first motor case at a portion closer to the second motor unit than the first rotation angle detection unit;
the brushless motor further comprises a detection unit support member that supports the first rotation angle detection stator;
the first rotation angle detection stator is fixed to the first motor case via the detection unit support member; and
the second rotation angle detection stator is directly fixed to the first motor case.

2. The brushless motor according to claim 1, further comprising a first positioning member that positions the detection unit support member and the first motor case in a rotation direction.

3. The brushless motor according to claim 1, wherein:
the second motor unit includes a second rotor provided on the rotary shaft, a second stator arranged so as to surround an outer periphery of the second rotor, and a second motor case in which the second stator is arranged; and
the brushless motor further comprises a second positioning member that positions the first motor case and the second motor case in a rotation direction.

4. The brushless motor according to claim 2, wherein:
the second motor unit includes a second rotor provided on the rotary shaft, a second stator arranged so as to surround an outer periphery of the second rotor, and a second motor case in which the second stator is arranged; and
the brushless motor further comprises a second positioning member that positions the first motor case and the second motor case in a rotation direction.

5. The brushless motor according to claim 1, further comprising:
   a first fixing member that fixes the first rotation angle detection stator to the detection unit support member; and
   a second fixing member that fixes the second rotation angle detection stator to the first motor case.

6. The brushless motor according to claim 1, wherein the first motor case includes a cable outlet port for drawing a cable of the first rotation angle detection unit and a cable of the second rotation angle detection unit.

7. The brushless motor according to claim 1, wherein the detection unit support member and the first motor case have a fitting structure that aligns an axial center of the first rotation angle detection unit supported by the detection unit support member with an axial center of the first stator arranged in the first motor case.

8. The brushless motor according to claim 3, wherein the first motor case and the second motor case have a fitting structure that aligns an axial center of the second rotation angle detection unit arranged in the first motor case with an axial center of the second stator arranged in the second motor case.

\* \* \* \* \*